(12) United States Patent
Marupaduga

(10) Patent No.: US 12,160,784 B2
(45) Date of Patent: *Dec. 3, 2024

(54) DYNAMIC HANDOVER PARAMETER ADJUSTMENT BASED ON AMOUNT OF PACKET DROPS AT DUAL-CONNECTIVITY ACCESS NODE PAIR

(71) Applicant: Sprint Spectrum LP, Overland Park, KS (US)

(72) Inventor: Sreekar Marupaduga, Overland Park, KS (US)

(73) Assignee: Sprint Spectrum LP, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,220

(22) Filed: May 31, 2023

(65) Prior Publication Data
US 2023/0308965 A1 Sep. 28, 2023

Related U.S. Application Data

(63) Continuation of application No. 16/944,882, filed on Jul. 31, 2020, now Pat. No. 11,743,786.

(51) Int. Cl.
*H04W 36/00* (2009.01)
*H04W 24/08* (2009.01)
*H04W 92/10* (2009.01)

(52) U.S. Cl.
CPC ..... *H04W 36/00837* (2018.08); *H04W 24/08* (2013.01); *H04W 36/0069* (2018.08); *H04W 92/10* (2013.01)

(58) Field of Classification Search
CPC ....... H04W 36/00837; H04W 36/0069; H04W 24/08; H04W 92/10
See application file for complete search history.

(56) References Cited

U.S. PATENT DOCUMENTS

| | | | |
|---|---|---|---|
| 8,351,326 B2 | 1/2013 | Parker | |
| 10,791,487 B1 | 9/2020 | Sung et al. | |
| 11,743,786 B1 * | 8/2023 | Marupaduga | H04W 24/02 370/331 |
| 2011/0171952 A1 * | 7/2011 | Niu | H04W 36/22 455/422.1 |
| 2013/0142047 A1 * | 6/2013 | Ramasamy | H04L 43/0829 370/235 |
| 2015/0223093 A1 * | 8/2015 | Zhang | H04W 28/0268 370/252 |
| 2016/0066223 A1 * | 3/2016 | Sawhney | H04W 36/00837 455/436 |
| 2017/0208526 A1 * | 7/2017 | Madan | H04W 52/367 |

(Continued)

*Primary Examiner* — Chi H Pham
*Assistant Examiner* — Weibin Huang
(74) *Attorney, Agent, or Firm* — Jones Robb, PLLC

(57) ABSTRACT

A system may include an access node to deploy a radio air interface to provide wireless services to one or more wireless devices. The access node may include processing circuitry. The processing circuitry of the access node may monitor an amount of packet drops at a shared network device of a dual connectivity access-node-pair. The processing circuitry of the access node may dynamically adjust one or more handover parameters based on the amount of packet drops at the shared network device. The handover parameters may be adjusted to inhibit handovers to the dual connectivity access-node-pair.

18 Claims, 7 Drawing Sheets

(56) References Cited

U.S. PATENT DOCUMENTS

| | | | |
|---|---|---|---|
| 2017/0367024 A1* | 12/2017 | Chiba | H04W 36/00692 |
| 2018/0227781 A1* | 8/2018 | Chaudhuri | H04L 43/08 |
| 2019/0045578 A1* | 2/2019 | Oyman | H04L 65/1104 |
| 2021/0007025 A1 | 1/2021 | Kumar et al. | |
| 2021/0112439 A1* | 4/2021 | Leung | H04L 65/1069 |

* cited by examiner

DYNAMIC HANDOVER PARAMETER ADJUSTMENT BASED ON AMOUNT OF PACKET DROPS AT DUAL-CONNECTIVITY ACCESS NODE PAIR

TECHNICAL BACKGROUND

A wireless network, such as a cellular network, may include one or more access nodes (e.g., base stations) to wirelessly communicate with one or more wireless devices (also known as user equipment (UE)), for example via radio frequency transmissions. An access node may provide one or more cells that the wireless devices may connect to for wireless communication, with each cell corresponding to a frequency band and a radio access technology (RAT) and having a corresponding coverage area (sector). Some wireless networks may utilize multiple frequency bands and/or multiple RATs for wireless communication. In some networks, cells having different frequency bands and/or different RATs may have the same or overlapping coverage areas.

As wireless networks evolve and grow, there are ongoing challenges in communicating data across different types of networks. For example, as wireless technology continues to improve, various different RATs may be deployed together within a single wireless network. Such heterogeneous wireless networks can include newer 5G and millimeter wave (mm-wave) networks, as well as older legacy networks (such as 3G). In some cases, when access nodes utilizing one RAT (e.g., 5G new radio (NR)) are deployed alongside or co-located with access nodes utilizing another RAT (e.g., 4G long-term evolution (LTE)), dual connectivity technology may be utilized to allow the wireless device to be simultaneously connected to multiple cells utilizing the different RATs. One example of dual-connectivity technology is E-UTRAN-NR Dual Connectivity (EN-DC), which enables a wireless device to be connected to a 4G LTE cell and a 5G NR cell at the same time. Hereinafter, two or more access nodes that are arranged to work together using dual-connectivity technology, so that a wireless device may connect to all of the nodes simultaneously, may be referred to as a "dual connectivity access-node-pair," a "pair" of nodes, "paired" nodes, or a "node-pair." Other terms occasionally used in the art to refer to such a dual connectivity access-node-pair include "dual connectivity group," "EN-DC group," "cell group," and the like. Note that "pair" as used herein is not limited to just two units, but may include two or more units; thus, a "dual connectivity access-node-pair" is not limited to just two nodes, but may include any number of nodes.

In some dual connectivity systems, control information is transmitted using just one RAT (e.g., LTE), while user data is transmitted using the other RAT (e.g., 5G NR) or using both RATs (e.g., LTE and 5G NR). In some examples utilizing this arrangement, the node that handles control plane communication may be referred to as the "master" node or the "anchor" node, while the other node(s) may be referred to as a "secondary" node(s). In some cases, a wireless device may connect first to the master node, and then the master node may establish a connection between the wireless device and the secondary node if possible.

In some dual connectivity systems, data may be communicated with a wireless device using both RATs simultaneously, for example using transmissions methods known as "concurrent mode", or "split mode." In some cases, concurrent mode transmissions may be enabled by utilizing an antenna array that can simultaneously transmit (or receive) using multiple RATs (e.g., both 4G and 5G). For example, a cell site may include two (or more) paired access nodes that share an antenna array (and possibly other equipment such as a power supply), thus enabling simultaneous transmissions of data from the two nodes to the same wireless device via the same antenna array. As throughput and connectivity are positively correlated with power output, the split mode antenna array can control throughput and connectivity on each protocol by allocating power between the two nodes. This sharing of equipment not only reduces costs by avoiding the need to purchase multiple instances of equipment for the several nodes, but may also reduce the space requirements for that equipment at the cell site, where space is often at a premium, or potentially avoid the need for using multiple cell sites.

One difficulty in heterogenous networks that utilize dual connectivity is how to determine which cells the wireless devices should connect to and under what conditions they should be handed over to different cells. Existing techniques for handling handovers may not be well suited to the context of dual connectivity networks, as these techniques may fail to account for the wireless device being simultaneously connected to multiple access nodes utilizing different RATs, the different characteristics of these RATs, and the interactions between these access nodes. Accordingly, examples disclosed herein may include improved techniques for managing handovers in the context of dual connectivity networks.

OVERVIEW

Examples described herein include systems, methods, and processing nodes for dynamic handover parameter adjustment in a dual-connectivity network based on amount of packet drops at a shared router.

In one example, a method includes monitoring an amount of packet drops at a shared network device of a dual connectivity access-node-pair, and dynamically adjusting one or more handover parameters based on the amount of packet drops at the shared network device. The method may also include detecting whether the amount of packet drops satisfies a threshold criterion, and in response to the amount of packet drops satisfying the threshold criterion, adjusting the one or more handover parameters to inhibit handovers to a cell of the dual connectivity access-node-pair.

In another example, a system may include an access node configured to deploy a radio air interface to provide wireless services to one or more wireless devices. The access node may include processing circuitry configured to: monitor an amount of packet drops at a shared network device of a dual connectivity access-node-pair, and dynamically adjust one or more handover parameters based on the amount of packet drops at the shared network device.

In another example, a processing node is configured to perform operations, which may include e monitoring an amount of packet drops at a shared network device of a dual connectivity access-node-pair, and dynamically adjusting one or more handover parameters based on the amount of packet drops at the shared network device.

DETAILED DESCRIPTION

Figure 1:
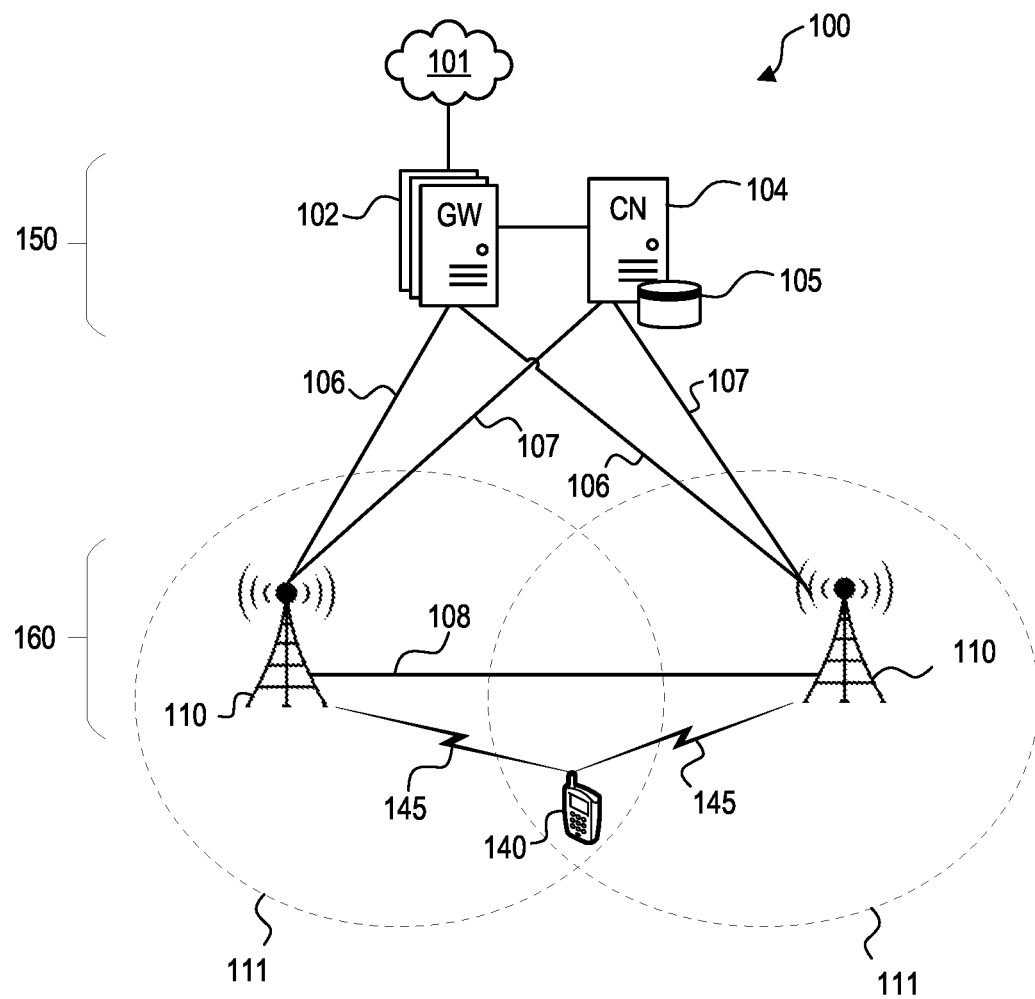
FIG. 1 depicts example wireless network.

Example embodiments described herein include systems, methods, and devices (e.g., processing nodes) for dynamic handover parameter adjustment based on an amount (rate) of packet drops at a shared network device of a dual-connectivity access node pair. Example embodiments described herein also include software (computer readable instructions) that may be stored on machine readable media and executed to cause a processor to perform operations described herein. The disclosed systems and methods may be implemented in any wireless networks in which access nodes utilize dual-connectivity techniques. In particular, the disclosed systems and methods may be beneficially employed, for example, in scenarios in which a pair of dual-connectivity access nodes share a network device (e.g., router) for inter-node and/or backhaul communication.

As noted above, existing techniques for managing handovers may not be well suited to the dual-connectivity context, as they may fail to account for various aspects of dual-connectivity. For example, one aspect of a dual connectivity system not well-addressed by existing handover techniques is the inter-node communication that often occurs between paired dual-connectivity access nodes. In some circumstances substantial amounts of data may need to flow between a pair of dual-connectivity access nodes, and this inter-node communication can affect the quality of communication with the wireless devices if it becomes heavy enough. Moreover, paired nodes may often be deployed together as part of a same cell site, and may share network equipment such as a cell-site router (CSR). In addition to the substantial amounts of data that would normally flow through such shared equipment, in some scenarios the aforementioned inter-node communication may also be routed through such shared equipment, and thus extreme traffic congestion may occur at times. In this arrangement, it is possible for some data packets to be dropped at the router. If the amount of packet drops at the router becomes too high, this can reduce the quality of experience (e.g., network throughput) for wireless devices connected to the pair of nodes.

Existing techniques for handover management do not account for such packet drops at a router of a node pair of a dual-connectivity system. Under existing handover techniques, each wireless device measures the signal strength of the wireless air interface of the various cells it can potential connect to, and a cell is selected by considering various handover criteria that generally compare the signal strengths of the target cells and/or the currently serving cell to specified handover parameters (e.g., threshold values). Generally, the wireless device will try to connect to the cell that has the strongest wireless signal, assuming other criteria a met. For example, a wireless devices may stay connected to their current cell until its signal strength become too low (as defined by the handover parameters) and/or until a cell with a signal strength sufficiently higher than that of the current serving cell (as defined by the handover parameters) is available.

But in a state in which there are high router packet drops at a dual-connectivity node pair, a new wireless device connecting to a cell of the affected node pair may experience sub-par network performance even if the signal strength of the cells is relatively high. Moreover, the addition of more wireless devices to the affected node pair, e.g., via handovers, may worsen the packet drops at the shared network device, due to the additional data streams associated with the new wireless devices. Thus, to avoid a poor quality of experience for a wireless device considering connecting to the affected node-pair and to avoid exacerbating existing packet drops at the shared router, it may be preferable for the wireless device to connect to (or remain connected to) another access node even if the signal strength of the other access node is relatively weak compared to the signal strength of the affected node-pair.

Thus, in example techniques disclosed herein the amount of packet drops (per unit time) at the shared router may be monitored, and if the amount becomes too high then the system may take actions to inhibit the handover of wireless devices to the affected node pair. In some cases, when handovers to a node-pair are inhibited it may still be possible for a handover to the affected node-pair to occur, for example if the signal strengths of other candidate nodes are sufficiently poor relative to the signal strength of the affected node-pair, but the disparity in signal strength that is required to justify a handover may be made higher than normal so that fewer wireless devices will qualify for a handover to the affected node-pair. In other cases, inhibiting handovers may include preventing handovers entirely. In either case, inhibiting handovers to a cell of a node-pair experiencing high packet drops at their shared router results in fewer new connections of wireless devices to the affected node-pair, thus avoiding exacerbating the packet drops at the shared network device. In addition, wireless devices that otherwise would have been handed over to the affected node-pair without the inhibition of handovers may have a better quality of experience than they would have if they had been handed over.

Inhibiting handovers to a node-pair experiencing high packet-drops may be accomplished by, for example, dynamically adjusting one or more handover parameters in a direction that makes a handover to the affected node-pair less likely (i.e., by making it more difficult to satisfy one or more handover criteria). Examples of handover parameters that may be adjusted to inhibit handovers include handover thresholds, handover offsets, and the like. The access nodes may also communicate information to adjoining access nodes that enables the adjoining nodes to adjust their handover parameters to inhibit wireless devices in their coverage area from being handed over to the node-pair experiencing high packet drops at the shared router. For example, an access-node-pair may share information with adjoining access nodes that quantitatively indicates the amount of packet-drops, such as by communicating a number representing the packet drop rate. This quantitative information enables the adjoining access nodes to make the primary determination for themselves based directly on the data as to whether or not (and in some cases by how much) they should inhibit handovers to the access-node-pair. In other examples, the access-node-pair may make the primary determination as to whether an amount of packet drops at their own shared network device is high (i.e., exceeds a threshold) and/or whether inhibiting of handovers is warranted, and then may share information with adjoining access nodes that qualitatively indicates to the adjoining access nodes that they should inhibit handovers to the access-node-pair. In such cases, the adjacent access nodes may rely on the determination made by the access-node-pair that packet drops are high and/or that inhibiting of handovers is needed, and initiate their own handover parameter adjustments to inhibit handovers to the access-node-pair based on this qualitative information, without necessarily analyzing the underlying quantitative data.

The term "wireless device" refers to any wireless device included in a wireless network. For example, the term "wireless device" may include a relay node, which may communicate with an access node. The term "wireless device" may also include an end-user wireless device, which may communicate with the access node through the relay node. The term "wireless device" may further include an end-user wireless device that communicates with the access node directly without being relayed by a relay node.

FIG. 1 depicts an example system for wireless communication. System 100 may be a wireless communication network, such as a cellular network. System 100 may include a radio access network ("RAN") 160 and a core or backend network 150. The RAN 160 may include access nodes 110 to deploy a radio air interface serving one or more wireless devices 140. The core network 150 may connect the RAN 160 to other networks 101, such as the Internet, and may provide services such as control plane management, subscription management, etc. In FIG. 1, the core network 150 comprises a gateway 102 and a controller node 104. Each wireless device 140 may be attached to the wireless air interface deployed by an access nodes 110 via wireless communication links 145. Access nodes 110 may communicate with the core network 150 via communication links, such as the communication links 106, 107 illustrated in FIG. 1. Access nodes 110 may communicate with each other using a communication link 108. Although two access nodes 110 are illustrated in FIG. 1 for simplicity, any number of access nodes 110 may be included in the system 100. System 100 can include various other components besides those illustrated, and other combinations or arrangements of carriers/wireless air interfaces, antenna elements, access nodes, and wireless devices, as may be evident to those having ordinary skill in the art in light of this disclosure.

The system 100 may use one or more wireless network protocols, such as one or more of Multimedia Broadcast Multicast Services (MBMS), code division multiple access (CDMA) 1×RTT (radio transmission technology), Global System for Mobile Communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). The system 100 may be a heterogenous system configured to deploy dual connectivity techniques. Thus, at least two of the access nodes 110 may be part of a dual-connectivity node-pair and may utilize different RATs—for example, one of the access nodes 110 may utilize a 4G LTE RAT and another access node 110 may utilize a 5G NR RAT. The node-pair may utilize, for example, EN-DC and/or concurrent mode techniques. Specific examples of the dual connectivity configuration of one example node-pair will be described in greater detail below in relation to FIG. 2.

In the example system 100 shown in FIG. 1, access nodes 110 may be macro-cell access nodes configured to deploy a wireless radio air interface including one or more cells, each cell having a corresponding frequency band, a corresponding RAT, and a corresponding coverage area such as the coverage area 111 illustrated in FIG. 1. Each access node 110 may be any network node configured to provide communication between end-user wireless devices 140 and a communication network 101, including standard access nodes such as a macro-cell access node, a base transceiver station, a radio base station, an evolved Node B (eNodeB) device, an enhanced eNodeB device, a next generation NodeB (or gNodeB) in 5G NR, or the like. Components of access nodes 110 are further described below in relation to FIG. 3.

Wireless devices 140 may be any device, system, combination of devices, or other such communication platform configured to wirelessly communicate with access node 110 using one or more frequency bands deployed therefrom. For example, end-user wireless devices 140 may include a mobile phone, a wireless phone, a wireless modem, a personal digital assistant (PDA), a voice over internet protocol (VoIP) phone, a voice over packet (VOP) phone, a soft phone, a computer, a tablet, a wearable smart device, an internet-of-things (IoT) device, as well as other types of devices or systems that may send and receive signals or data. Other types of communication platforms are contemplated.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals, for example, to support voice, push-to-talk, broadcast video, and data communication by end-user wireless devices 140. Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof. The wireless network provided by access node 110 may support any of the above-mentioned network protocols.

Communication links 106, 107, and 108 may use various communication media, such as air, laser, metal, optical fiber, or other signal propagation path, including combinations thereof. Communication link 106, 107, and 108 may be wired or wireless and may use various communication protocols such as Internet, Internet protocol (IP), local-area network (LAN), optical networking, hybrid fiber coax (HFC), telephony, T1, or other communication format, including combinations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106, 107, and 108 may be direct links or may include various intermediate components, systems, and networks. Communication links 106, 107, and 108 may enable different signals to share the same physical link. Thus, although FIG. 1 shows separate links 106, 107 coupling the access node 110 to the communication gateway 102 and the controller node 104, respectively, in some cases a single physical link may connect the access node 110 to the core network, and communication may be distributed to the various components of the core network by routers or other network equipment. In the context of 4G LTE and 5G networks, the links 106, 107 may be referred to as an S1 link or S1 interface and the link 108 may be referred to as an X2 link or X2 interface. One of ordinary skill in the art would recognize that links 106, 107, and 108 is not limited to any specific technology architecture, such as LTE or 5G NR, and may be used with any network architecture and/or protocol.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as LTE or 5G NR, and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a standalone computing device, a part of a computing system (e.g., a program, container, or virtual machine running on a computing system), a network component, or the like. The controller node 104 may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as LTE or 5G NR, and may be used with any network architecture and/or protocol.

Controller node 104 may include a processor and associated hardware circuitry configured to execute or direct the execution of computer-readable instructions to obtain information. Controller node 104 may retrieve and execute software from a storage device, which may include a disk drive, a flash drive, a memory circuitry or device, and which may be local or remotely accessible. In an example embodiment, controller node 104 may include a database 105 configured for storing information related to elements within system 100, such as configurations and capabilities of relay nodes 120, resource requirements of end-user wireless devices 140, priority levels associated therewith, and so on. The information may be requested by or shared with access nodes 110 via communication links 106, 107, 108 and so on. The software may include computer programs, firmware, or other form of machine-readable instructions, and may include an operating system, utilities, drivers, network interfaces, applications, or other type of software, and combinations thereof. In some examples, the controller node 104 is, or includes, an instance of the processing node 400 described below in relation to FIG. 4. In some embodiments, controller node 104 may receive instructions and other input at a user interface.

Other network elements may be included in system 100 and configured to facilitate communication but are omitted for clarity, such as base stations, base station controllers, mobile switching centers, dispatch application processors, and location registers such as a home location register or visitor location register. Furthermore, other network elements that are omitted for clarity may be included in system 100 to facilitate communication, such as additional processing nodes, routers, gateways, and physical and/or wireless data links for carrying data among the various network elements, e.g., between access node 110 and communication network 101.

Figure 2A:
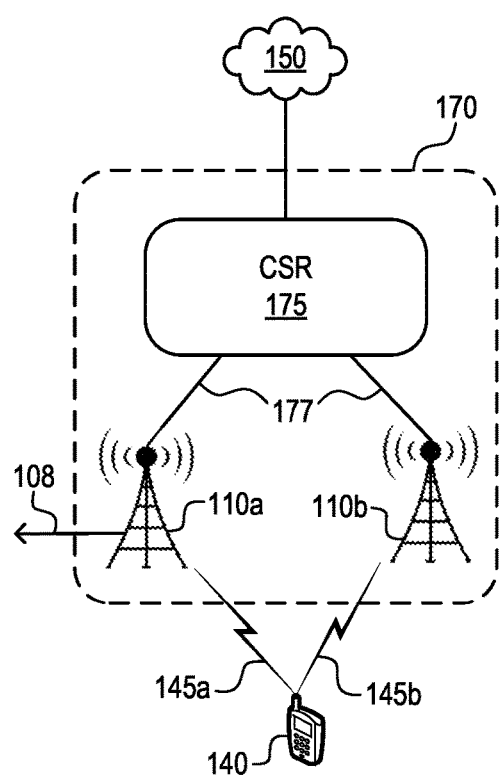
FIG. 2A depicts an example dual-connectivity access node pair.
Figure 2B:
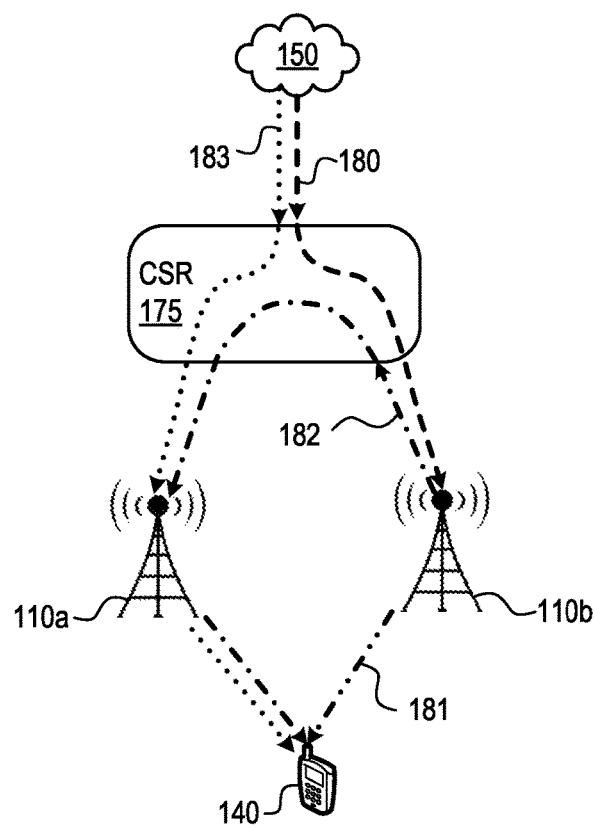
FIG. 2B depicts examples communication in the example dual-connectivity access node pair.

FIGS. 2A and 2B depict an example dual connectivity node-pair 170 of the system 100. The node-pair 170 includes a first access node 110a configured to utilize a first RAT and a second access node 110b configured to utilize a second RAT. The node-pair 170 also includes a cell site router ("CSR") 175, which routes communication between the network core 150 and the nodes 110a,b, as well as communication between the core network 150 and the nodes 110a,b. Thus, the CSR 175 may form a part of the link 108 connecting the nodes 110a,b together, as well as a part of the links 106,107 connecting the nodes 110a,b to the core network 150. More specifically, in examples in which the nodes 110a,b utilize LTE and 5G NR technologies, the CSR 175 may form a part of the X2 interface that couples the two nodes 110a,b together as well as part of the S1 interface that couples the nodes 110a,b to the core network 150.

The nodes 110a,b are part of a dual-connectivity node-pair, and thus a wireless device 140 may be able to connect to both nodes 110a,b at the same time. For example, the nodes 110a,b may utilize EN-DC techniques. In one example, the first access node 110a may act as a master node and the second access node 110b may act as a secondary node. Thus, in such an example, control plane data may be communicated between first access node 110a and the wireless device 140 via wireless link 145a. The wireless device 140 may initially connect to the master node, and the master node may initiate a connection with the secondary node. Once the wireless device 140 is connected to both the master node and the secondary node, there are various arrangements for how user plane data may flow between the core network 150, the node-pair 170, and the wireless device 140. In one arrangement, user plane data may be communicated between the master node and the wireless device 140 before establishing the connection to the secondary node, but after establishing the connection to the secondary node, user-plane data my flow exclusively between the secondary node and the wireless device 140. In another arrangement, user plane data may flow between both nodes 110 and the wireless device 140, including simultaneous communication in some examples. In examples in which both nodes 110 communicate user-plane data, it may be necessary to split up the communication of the wireless device 140 into separate streams for transmission by the respective access nodes 110a,b. In some examples, the decision of whether and how to split communication into multiple streams for transmission by the respective nodes 110a,b may be the responsibility of one of the nodes 110a,b. Either the master node or the secondary node may be given this responsibility.

FIG. 2B illustrates an example arrangement in which the second access node 110b, which is the secondary node, controls whether and how user plane communication are split. Thus, in this example, all user plane communication 180 sent from the core network 150 to the CSR 175 are routed first to the second access node 110b, and the second access node 110b determines what to do with the communication (e.g., whether and how to split the communication 180 into separate streams). The second access node 110b may split the communication into separate streams for transmission to, for example, improve throughput or other metrics. FIG. 2B illustrates the communication 180 being split by the second access node 110b into a first data stream 181 for transmission by the second access node 110b and a second data stream 182 for transmission via the first access node 110a. The second stream 182 is sent from the second access node 110b to the first access node 110a, from whence it is transmitted to the wireless device 140. In the example illustrated in FIG. 2B, the CSR 175 communicably connects the first and second access nodes 110a,b, and therefore when the second access node 110b sends the second data stream 182 to the first access node 110a, this is accomplished by sending the stream 182 to the CSR 175, which then routes the stream 182 to the first access node 110a. Thus, in this example some of the user plane data (e.g., the data that makes up stream 182) passes through the CSR 175 twice, once on its way to the second access node 110b as part of communication 180 before splitting and once again on its way to the first access node 110a as part of stream 182 post-split. In addition, control plane communication may also continue to be handled by the first access node 110a. In some examples, the control plane communication may be passed by the CSR 175 directly to the first access node 110a without being sent to the second access node 110b first, as illustrated by the communication 183 in FIG. 2B.

In a dual connectivity node-pair, such as the example node pair 170 illustrated in FIGS. 2A and 2B, there may be a substantial amount of data passing through a shared network device, such as the CSR 175. This data may include the usual data that would pass through an access node 110 that is not configured for dual-connectivity, but may also include additional inter-node traffic in a dual-connectivity system. In particular, as explained above, some of the user-plane data may pass through the CSR 175 twice. In view of this substantial load, some packet drops may occur at the CSR 175. Thus, as explained above, the system 100 may monitor the amount of packet drops at the CSR 175, and may inhibit handovers to the node-pair 170 if the packet drops get too high. The functionality of monitoring the packet drops and inhibiting the handovers may reside in one or both of the access nodes 110a,b, the CSR 175, the controller node 104, in some other device, or in some combination of these. In one example, CSR 175 may report the amount of packet drops to one or both of the access nodes 110a,b (periodically, or upon request), and one or both of the access nodes 110a,b may include logic for monitoring the packet drop amount and determining whether (and if so how much) to adjust handover parameters to inhibit handovers to the node-pair 170. The one of the access nodes 110a,b may also communicate information with adjoining access nodes 110 that may enable them to also adjust handover parameters to inhibit handovers to the node-pair 170.

Figure 3:
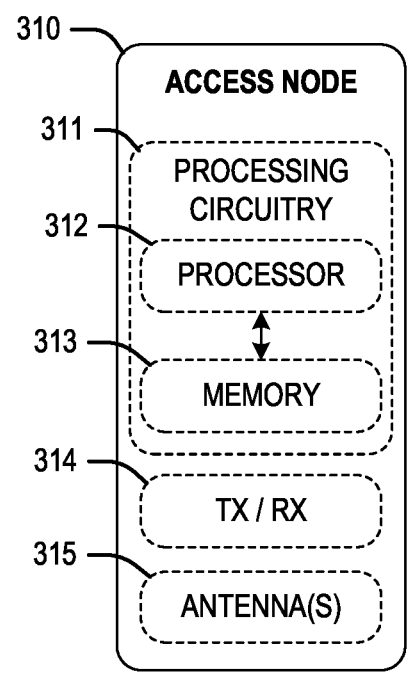
FIG. 3 depicts an example access node.

FIG. 3 depicts an example access node 310. Access node 310 may include, for example, a macro-cell access node. Access node 310 may be an embodiment of access node 110 described with reference to FIGS. 1 and 2, and thus the description of access node 110 herein is applicable to access node 310 and vice-versa. Access node 310 may include a processing circuitry 311 configured to perform various operations described herein for dynamic handover parameter adjustment based on packet drop rate. In addition, processing circuitry 311 may be configured to schedule or allocate resources, including downlink and uplink resources, for wireless devices communicably coupled to the access node 310, such as relay nodes and/or end-user wireless devices that are directly connected with access node 310. The processing circuitry 311 may include logic for performing the various operations, with the logic comprising hardware, software, or any combination thereof. Access node 310 may also include, a memory 313, one or more transceivers 314, and one or more antennas 315.

In some examples, the processing circuitry 311 may include a processor 312 and a memory 313 storing software (instructions) executable by the processor 312 to cause the processor 312 to perform one or more of the operations described herein. In examples in which the processing circuitry 311 includes a processor 312, the processing circuitry 311 may be considered as being configured to perform various operations disclosed herein by virtue of the memory 313 storing instructions to perform those operations such that they could be accessed and executed by processor 312. Thus, the processor 312 does not necessarily need to be executing or have executed the instructions to be considered as being configured to perform the operations—as long as the instructions are present in a state in which they could be executed upon operation of the device, then the processing circuitry may be considered as being configured to perform the operations. The processor 312 may include any processing resource capable of executing machine readable instructions, such as, for example, a processor, a processor core, a central processing unit (CPU), a controller, a microcontroller, a system-on-chip (SoC), a digital signal processor (DSP), a graphics processing unit (GPU), etc.

As another example, the processing circuitry 311 may include dedicated hardware (not illustrated), in addition to or in lieu of the processor 312, to perform some or all of the operations described herein. Examples of such dedicated hardware may include an Application Specific Integrated Circuit (ASIC), a Field Programmable Gate Array (FPGA), a Complex Programmable Logic Device (CPLD), or the like. The processing circuitry 311 may also include any combination of dedicated hardware and processor/software.

Transceiver(s) 314 and antenna array(s) 315 may be configured to provide an air interface to enable wireless communication with wireless devices. The wireless interface provided may be provided via one or more cells, each having a corresponding frequency band, RAT, and coverage area. The processing circuitry 311 may be configured to direct or control the transceiver(s) 314 in the deployment of the wireless radio air interface. Antenna array(s) 315 may include one or more antenna elements that are configured to deploy air interfaces over one or more wireless sectors, form beams within these sectors, employ multiple-input-multipleoutput (MIMO), etc. In some examples, the same antenna array 315 may be configured to provide air interfaces for different RATs. For example, one set of antennae elements may be configured to utilize a 4G LTE interface while another set of antennae elements may be configured to utilize a 5G NR air interface. Thus, in some examples, one antenna array(s) 315 may be shared by multiple access nodes 310 (e.g., an LTE eNodeB access node 310 and a 5G NR gNodeB access node 310), which may be collocated at the same cell site.

In FIG. 3 various components of the access node 310 are illustrated and described separately for convenience of description, but this should not be misunderstood as implying that these components are necessarily physically distinct. In other words, components of an access node 310 that were illustrated and described separately may be embodied in the same underlying hardware. For example, the transceiver(s) 314 may be embodied, in whole or in part, in the processing circuitry 311, such as in processor 312, or vice-versa.

In addition to the possibility of multiple access nodes 310 sharing an antenna array 315, in some examples, multiple access nodes 310 may share other hardware, such as a power supply, networking devices (e.g., cell site-router (CSR), and so on. Such sharing of hardware may include, in some examples, sharing processing hardware that forms the processing circuitry 311 of the access nodes, using virtualization techniques. For example, the processing functions of the various access nodes 310 may be instantiated as separate software programs, containers, virtual machines, etc., running on the same hardware. Virtualization allows multiple processing systems to share the same underlying processing hardware, while still behaving (and appearing to other entries) in many ways as if they are physically separate systems. Functionally, such access nodes 310 may continue to operate as logically separate and distinct nodes, despite being instantiated on shared hardware. Systems sharing the same processing hardware by virtualization may be referred to as "logical" or "virtual" systems. Thus, in examples in which the processing functions of an access node 310 are instated on shared hardware, the processor 312 may be referred to as a virtual processor 312, and the access nodes 310 may be referred to as virtual access nodes 310. This usage of "virtual" in no way implies that the access node 310 is ephemeral, transitory, or any less "real" or substantial than a non-virtualized access node 310—the same underlying physical hardware may be present in both virtual and non-virtual access nodes 310—rather, the term "virtual" merely signifies that some of the underlying physical processing hardware is shared. Such virtualization of access nodes 310 may be beneficial, for example, in scenarios where multiple access nodes 310 are to be deployed in the same cell site, as it may reduced the amount of physical equipment that needs to be located at the site. For example, in a dual connectivity scenario, an eNodeB and a gNodeB that are to form a dual-connectivity pair may be deployed together in the same physical device ("box"). Similarly, other components of the network (e.g., the CSR 175) may also be virtualized.

Figure 4:
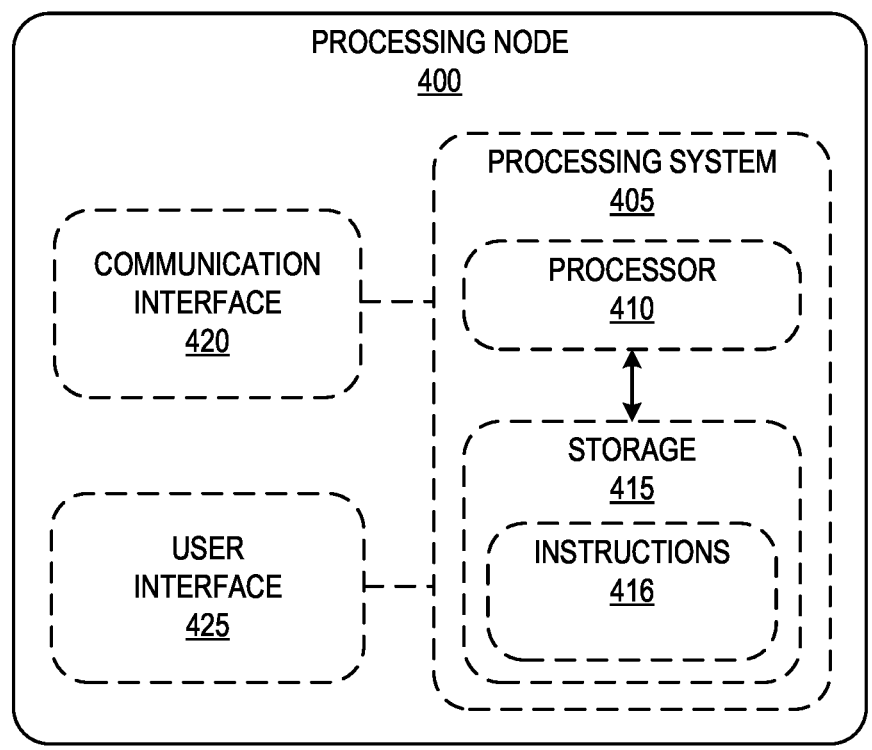
FIG. 4 depicts an example processing node.

FIG. 4 depicts an example processing node 400, which may be configured to perform some or all of the methods and operations disclosed herein for dynamic handover parameter adjustment. In some embodiments, processing node 400 may be included as part of an access node, such as access node 110 or 310. In other embodiments, processing node 400 may be included in some other device, such as controller node 104.

Processing node 400 may include a processing system 405. Processing system 405 may include a processor 410 and a storage 415. Storage 415 may include a disk drive, a flash drive, a memory, or other storage device configured to store data and/or computer readable instructions or codes (e.g., software). The computer executable instructions or code maybe accessed and executed by processor 410 to perform various operations or methods disclosed herein. Software stored in storage device 415 may include computer programs, firmware, or other form of machine-readable instructions, including an operating system, utilities, drivers, network interfaces, applications, or other type of software. For example, software stored in storage device 415 may include a module for performing various operations described herein. Processor 410 may be a microprocessor and may include hardware circuitry and/or embedded codes configured to retrieve and execute software stored in storage device 415.

In examples in which the processing node 400 is included in the access node 110, 310, the processing node 400 may be an embodiment of, may include, or may be included in, the processing circuitry 311.

Processing node 400 may include a communication interface 420 and a user interface 425. Communication interface 420 may be configured to enable the processing system 405 to communicate with other components, nodes, or devices in the wireless network. Communication interface 420 may include hardware components, such as network communication ports, devices, routers, wires, antenna, transceivers, etc. User interface 425 may be configured to allow a user to provide input to processing node 400 and receive data or information from processing node 400. User interface 425 may include hardware components, such as touch screens, buttons, displays, speakers, etc. Processing node 400 may further include other components such as a power management unit, a control interface unit, etc.

Figure 5:
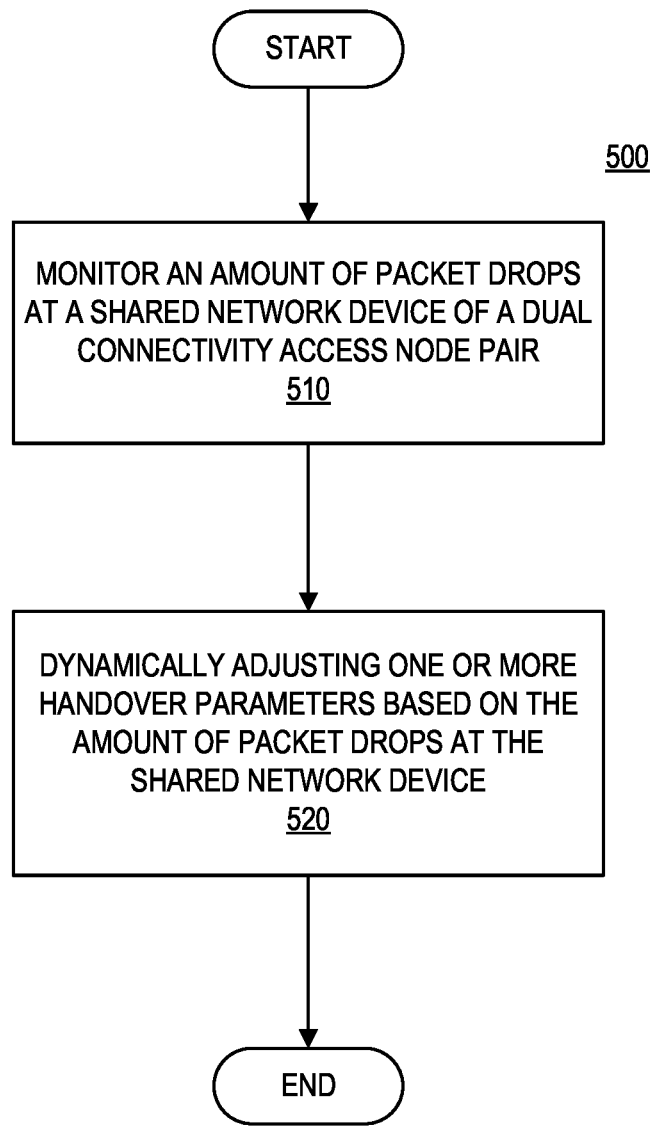
FIG. 5 depicts an example method for dynamic handover parameter adjustment in a dual-connectivity network.

Some examples of the disclosed techniques and methods for dynamic handover parameter adjustment are discussed further below. FIG. 5 illustrates an example method for dynamic handover parameter adjustment. Method 500 may be performed by any suitable processing circuitry, such as for example by a processor included in access node 110 or 310, processing node 400, or controller node 104. For discussion purposes, as an example, method 500 is described below as being performed by a processor included in access node 110, 310.

Method 500 may include monitoring an amount of packet drops at a shared network device of a dual connectivity node pair (step 610). The shared network device may be, for example a cell-site router such as the CSR 175. In some examples, the monitored amount of packet drops may be a number of packet drops that occurred during a designated time period (e.g., the most recent five (5) second interval). In some examples, the monitored amount of packet drops may be some statistical aggregation of the raw packet drop data, such as a moving average of packet drops per unit time, a peak number of packet drops per unit time during a specified interval, etc. Data on the number of packet drops may be provided to the monitoring entity (e.g., the access nodes 110, 310) by the CSR 175, which may be configured to collect and report this information. The CSR 175 may provide the information periodically to the monitoring agency without prompting, or the monitoring agency may request the information from the CSR 175 as needed.

Method 500 may also include dynamically adjusting one or more handover parameters based on the amount of packet drops at the shared network device (step 520). In particular, the parameters may be adjusted such that handovers to the node-pair are inhibited when packet drop amount is high. In other words, the parameters are adjusted such that handovers are less likely (more difficult) when the amount of packet drops is relatively high and more likely (less difficult) when the amount of packet drops is relatively low. Examples of handover parameters that may be adjusted to inhibit handovers include handover thresholds, handover offsets, and the like.

In some examples, the inhibition of handovers based on packet drops may be binary, meaning that handovers are either inhibited to a fixed degree or not at all based on the packet drops. In this case, there may be one fixed amount of by which the handover parameter is adjusted if the packet drops exceed a threshold, and otherwise no amount of packet-drop adjustment is applied.

In other examples, the degree to which handovers are inhibited may vary based on the degree to which packet drops are occurring. In such cases, the adjustment of the handover parameters may involve more gradations, with multiple different adjustment amounts being used depending on the amount of packet drops. The variation of the adjustment amount may be a step-wise (discrete) variation between a finite set of pre-specified adjustment amounts, or the adjustment amount may be a continuous function of the packet drop amount. One example of discrete steps of variation involves comparing the packet drop amount to multiple threshold values, with each threshold being associated with a different adjustment amount—e.g., if packet drops reach a first threshold, then the handover parameters may be adjusted by a first amount and if packet drops reach a second threshold then the handover parameters may be adjusted by a second amount. One example of varying the adjustment amount as a continuous function of the packet drop amount would be to vary the adjustment amount proportionally to (i.e., as a linear function of) the packet drop amount. Any other functional relationship could be used, such as a logarithmic relationship, polynomial relationship, exponential relationship, etc. In some examples, functional relationships and discrete threshold testing may be combined. For example, no adjustment may be applied if packet drops are below a threshold value but if packet drops reach/exceed the threshold value then the parameter is adjusted with the adjustment amount varying as a function of packet drops thereafter.

The adjustment of the handover parameter may be dynamic. This means that the determinations to adjust the parameter are made during normal system usage and can vary in real-time based on feedback of a current state of a system variable (i.e., packet drop amount). This is in contrast to a static adjustment that may occur only during special states (e.g., initialization, shutting down, maintenance, manual use adjustment, etc.) and/or or that does not vary in real time based on the current state of a system variable. In this context, "in real-time" refers to responding to changes in the system variable within a relatively short amount of time from when the change occurs, such as within a few seconds. The "current state" of the system variable refers to a state of the system variable as measured/determined/reported relatively recently, such as within the last few seconds or within an amount of time equal to a few measurement/reporting intervals of the system variable. In some examples, the adjustment of the parameters may also involve some provision for hysteresis, to avoid frequent oscillation between states. For example, once handover parameters have been adjusted to inhibit handovers based on the packet drops, they may be kept in their adjusted state for a designated amount of time.

As noted above, a handover parameter may include, for example, a threshold, an offset, or the like. A handover threshold may be a value that is compared to a signal strength of a cell (or some other value related to signal strength, such as the difference between two signal strengths) as part of evaluating a handover criterion used to determine whether to proceed with a handover. For example, one handover criterion may be that a handover to a target cell may occur if the signal strength of its current serving cell is below a threshold value TH1 and the signal strength of the target cell exceeds a threshold value TH2. In such a case, the network could inhibit handovers to a given node-pair by decreasing the value of TH1 and/or increasing the value of TH2 for the target cell. A handover offset may be a value that is added to or subtracted from a signal strength of a cell for evaluating a handover criteria. For example, one handover criterion may be that a handover to a target cell may occur if the signal strength of the target cell minus an offset $O_1$ for the target cell exceeds the signal strength of the currently serving cell plus an offset $O_2$ for the serving cell. In such a case, the network could inhibit handovers to a given node-pair by increasing the value of $O_1$ for the given node pair and/or increasing the value of $O_2$ for the serving cell.

The handover criteria mentioned above are merely examples used for purposes of illustration, and any handover criterion or combination of criteria may be used. One of ordinary skill in the art would be familiar with many different types of handover criteria, such as those specified in various wireless communication protocols, standards, specifications, etc., and thus such well-known handover criteria are not described in detail herein. Some examples of handover criteria specified by a communication protocol/standard include, but are not limited to, the A1, A2, A3, A4, A5, B1, and B2 measurement events specified for LTE and 5G systems.

Although thresholds and offsets are described above separately for ease of explanation, there is not necessarily a strict delineation between a threshold and an offset. The same parameter could function as an offset when a handover criterion is expressed one way and as a threshold when the criterion is expressed in another logically equivalent way. For example, the criterion $S_1+P_1>S_2$ involves adding $P_1$ to a signal strength measurement $S_1$ and comparing the result to another signal strength measurement $S_2$, and in this expression of the criterion parameter $P_1$ is functioning as an offset (a value added to a signal strength measurement). But this handover criteria could be equivalently expressed as $S_2-S_1<P_1$, in which case the parameter $P_1$ is now functioning as a threshold (a value to which something is compared) rather than as an offset.

There may be other handover parameters utilized in a network besides thresholds and offsets, such as hysteresis values, coefficients or scaling factors (values that are multiplied or divided with other value), timing parameters, and so on. Any handover parameter may be used for the packet-drop adjustment as long adjusting the parameter in a certain direction inhibits handovers to the node-pair. In some examples, the handover parameter that is adjusted based on the packet drops may also be used for other purposes. For example, the handover parameter that is adjusted based on the packet drops may be a handover parameter that is defined by a wireless communication protocol, standard, or specification, and which may have been originally intended for some purpose other than packet-drop adjustments in a dual-connectivity scenario. In other words, the techniques disclosed herein may be integrated into existing handover protocols without necessarily needing to define new handover parameters specific. In other examples, the handover parameter that is adjusted may be a new parameter that is specific to the packet-drop considerations described herein. Some example signal levels may comprise a Received Signal Strength Indicator, (RSSI), Reference Signal Received Quality (RSRQ), RSRP, or any other suitable signal level.

In some examples, the currently serving access nodes may control handovers of the wireless devices connected thereto, rather than the target access node directly controlling the handovers. For example, the wireless devices may perform measurements and communicate them to their serving node, and then the serving node may apply the handover criteria using the handover parameters to determine whether or not a handover may proceed. In other examples, the wireless devices may participate more actively in the handover process. For example, in addition to performing measurements, the wireless devices may also determine if handover criteria are met based on handover parameters specified by the network, and may information the access node that it would like a handover. In some cases, the serving access node will trust that the wireless device correctly applied the handover criteria, which may be defined as part of a wireless communication protocol, for example, and thus will initiate the handover without much oversight. In such cases, the serving access node exercises indirect control over the handovers by setting and communicating the handover parameters to the wireless devices. In other cases, the access node may perform some checks or validations before initiating the handover based on the wireless device's request. Regardless of how much direct control the serving access node exerts on the process, the serving access node usually plays some role in the handover process for its connected wireless devices, including usually at least the setting of handover parameters.

Thus, in some examples, in order to inhibit handovers to a first access node (which may be part of an access-node-pair), a second adjoining access node may need to adjust the values of its handover parameters, rather than (or in addition to) the first access node adjusting its own handover parameters. Thus, when a node-pair experiences high packet drops, it may need to communicate packet-drop information with its neighboring access nodes so that they can adjust their handover parameters to inhibit handovers to the node-pair. The packet-drop information may be any information that enables the neighboring access nodes to determine, qualitatively or quantitatively, an amount of packet drops at the affected node pair. Qualitatively determining the amount of packet drops may comprise determining that an amount of packet drops is high or low without necessarily knowing the exact quantitative number of packet drops. For example, a notification/instruction received from a node-pair that the inhibiting of handovers to the node-pair is needed can be considered as packet-drop information that qualitatively indicates to the receiving access node that the amount of packet drops at the node-pair is high. Quantitatively determining the amount of packet drops may comprise determining a number that represents the amount of packet drops, such as a packet drop rate number reported by a shared network device, a statistical aggregation of packet drop data (e.g., moving average number packet drops), or the like. In examples in which the packet drop information is qualitative, the receiving node may apply a predetermined amount of adjustment to the handover parameter or rely the sender to instruct how much to adjust the handover parameter by. In some examples in which the packet drop information is quantitative, the receiving node may be able to determine a variable amount of adjustment for the handover parameter on its own.

Thus, in some examples of Method 500, the access node that adjusts its handover parameters in Step 520 is part of the dual-connectivity node-pair whose packet drops are monitored in Step 510, in other examples the access node whose handover parameters are adjusted in Step 520 is not part of the dual-connectivity node pair whose packet drops are monitored in Step 510, and in some examples both the affected access-node-pair and the adjacent access node may adjust their own handover parameters. Moreover, when it is said herein that an entity "adjusts" a handover parameter, this may include both an access node directly adjusting its own handover parameters (e.g., by sending out adjusted values for the handover parameters to its connected wireless devices) and an access node indirectly adjusting another node's handover parameters sending the other access node a message that causes (or is configured to cause) the second access node to directly adjust its handover parameters.

Figure 6:
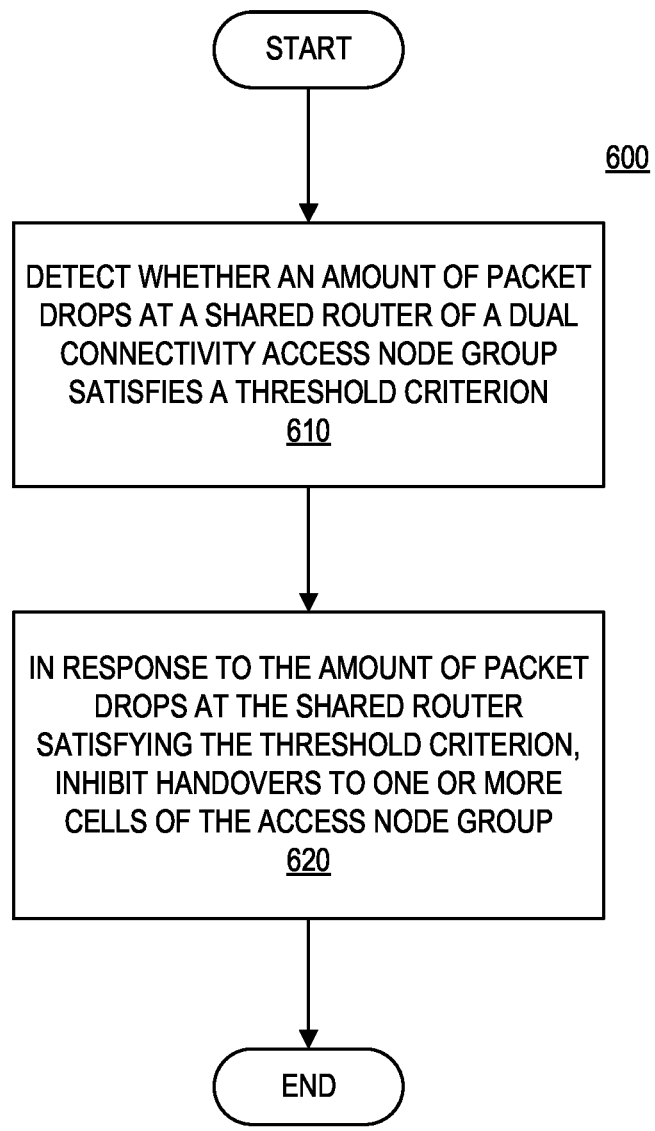
FIG. 6 depicts another example method for dynamic handover parameter adjustment in a dual-connectivity network.

FIG. 6 illustrates another example method for dynamic handover parameter adjustment. Method 600 may be performed by any suitable processing circuitry, such as for example by a processor included in access node 110 or 310, processing node 400, or controller node 104. For discussion purposes, as an example, method 600 is described as being performed by a processor included in access node 110. Method 600 may be one specific example implementation of step 520 of Method 500.

Method 600 includes detecting whether an amount of packet drops at a shared network device (e.g., cell site router) of a dual connectivity node pair satisfies a threshold criterion (step 510). The threshold criterion may include comparing the amount of packet drops to a threshold value to determine if the amount of packet drops meets the threshold value. The threshold criterion may be satisfied if the amount of packet drops exceeds the threshold value, or in some examples if the amount of packet drops equals-or-exceeds the threshold value.

Method 600 may also include, in response to the amount of packet drops at the shared router satisfying the threshold criterion, inhibiting handovers to one or more cells of the node-pair (Step 620). The inhibiting of handovers may include adjusting a handover parameter, as described above. In some examples, only one threshold value is considered, and only one level of adjustment amount is used for adjusting the handover parameter, as discussed above. In other examples, multiple thresholds may be considered and multiple different levels of adjustment may be used dependent on which thresholds are met, as discussed above. In some examples, the inhibiting of handovers may include the total prevention of all handovers to the access nodes. This may be accomplished by, for example, adjusting a handover parameter to sufficiently high (or low) level that handovers are practically impossible, or by instituting a policy or state in which handovers are not allowed (without necessarily adjusting any handover parameters).

Figure 7:
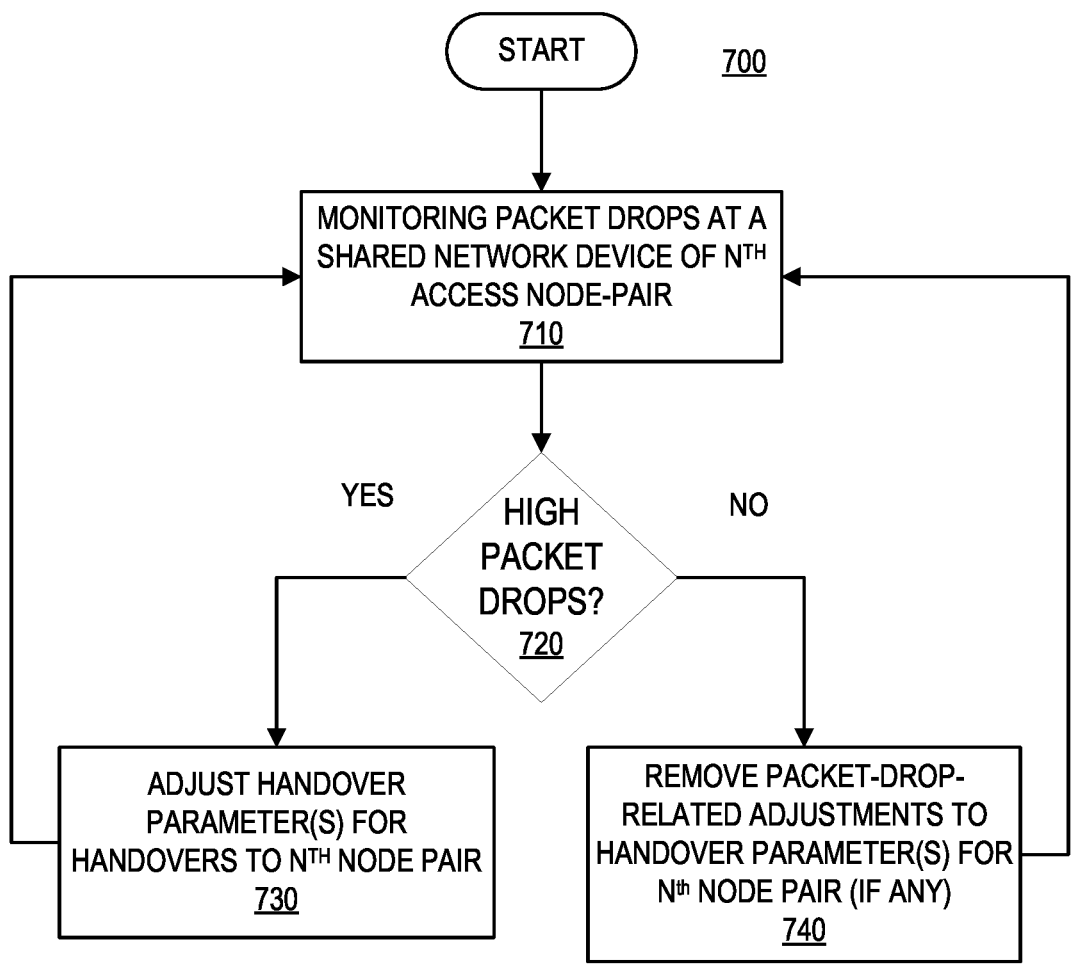
FIG. 7 depicts another example method for dynamic handover parameter adjustment in a dual-connectivity network.

FIG. 7 illustrates another example method for dynamic handover parameter adjustment. Method 700 may be performed by any suitable processing circuitry, such as for example by a processor included in access node 110 or 310, processing node 400, or controller node 104. For discussion purposes, as an example, method 700 is described as being performed by a processor included in access node 110. Method 700 may be one specific example implementation of Method 500.

Method 700 includes monitoring packet drops at a shared network device (e.g., router) of an $N^{th}$ dual-connectivity access-node-pair (Step 710). In some examples, the $N^{th}$ access node-pair may be part of the entity that is performing Method 700 (i.e., an access node of the $N^{th}$ access-node pair is monitoring its own shared network device). In other examples, the $N^{th}$ access node-pair may be different from the entity that is performing Method 700. For example, another access node may monitor for high packet drops at a neighboring access node-pair. As another example, a device other than an access node, such as a controller node 104, may monitor for high packet drops at a node-pair.

As noted above, the access nodes may communicate packet drop information with one another. The access nodes may also communication packet drop information with other devices, such as a controller node 104. This packet drop information may specify the actual quantitative amount of packet drops in some examples. In other examples, it may include some other indication from which the recipient can determine whether or not packet drops are qualitatively high at the sending node-pair or whether inhibition of handovers is needed, such as a flag that is set for a high-packet drop state, indicating handovers should be inhibited, and reset (i.e., not set) otherwise. Thus, in some examples, monitoring for high packet drops at the $N^{th}$ access node-pair may entail monitoring for such communication of packet drop information from the $N^{th}$ node-pair.

Method 700 further includes determining whether there are high packet drops at the $N^{th}$ access node-pair, (Step 720), based on the information gleaned in Step 710.

In examples in which the actual quantitative amount of packet drops is obtained in Step 710, the determination in Step 720 may include applying a threshold criterion to the amount of packet drops, as described above in relation to step 520 of Method 500. If the threshold criterion is satisfied, then it may be determined that there is a high packet drop state at the $N^{th}$ node-pair, and the process may continue to step 730 (YES determination result). Otherwise, the process may continue to Step 740 (NO determination result).

In examples in which the packet drop information obtained in Step 710 does not indicate the actual quantitative amount of packet drops, then the determination made in step 720 may be based on whether any communication has been received from the $N^{th}$ node-pair that indicates a qualitatively high packet drop amount. For example, if the $N^{th}$ pair has set a flag that indicates a high packet drop state, sent a notification of a high packet drop state, sent an instruction to inhibit handovers, sent an instruction to adjust handover parameters, or the like, then it may be determined that there is a high packet drop amount at the $N^{th}$ node-pair and the process may continue to step 730 (YES determination result). Otherwise, the process may continue to Step 740 (NO determination result).

Method 700 further includes, when the determination in Step 720 is affirmative, adjusting one or more handover parameters associated with handovers to the $N^{th}$ node-pair. Some handover parameters may be node- or cell-specific. Thus, for example, there may be an offset $O_{n\_target}$ that is to be used when a cell of the $N^{th}$ node-pair is a target of a handover determination. In other cases, handovers parameters may be related generally to the role of cell in the handover (e.g., serving vs target) without necessarily being cell-specific. For example, an offset $O_{target}$ might be applied to any cell that is being considered as a target, including but not limited to a cell of the $N^{th}$ node-pair. In some examples, the handover parameter that is adjusted in Step 720 is node- or cell-specific, such as the offset $O_{n\_target}$ noted above. In other examples, the handover parameter that is adjusted in Step 720 is not specific to the $N^{th}$ node-pair, but nonetheless may be adjusted to inhibit handovers to the $N^{th}$ node, such as the offset $O_{target}$ noted above. In some circumstances, node- or cell-specific handover parameters may be preferable as adjustment candidates, as this allows inhibiting handovers to just the affected node-pair, instead of inhibiting handovers to all adjoining cells.

In some examples, the amount by which the handover parameters are to be adjusted in Step 730 is a fixed amount that is applied whenever inhibiting of handovers is needed. In other examples, the amount by which the handover parameters are adjusted in Step 730 may vary based on the amount of packet drops. In some examples, the entity performing method 700 knows the actual amount of packet drops at the $N^{th}$ node-pair and thus may determine the amount by which to adjust the handover parameters by considering threshold criteria and/or using a mapping function. In some examples, the entity performing method 700 does not know the actual amount of packet drops at the $N^{th}$ node-pair, but the packet drop information communicated from the $N^{th}$ node-pair may specify an amount by which the handover parameters are to be adjusted.

After adjusting the handover parameters in step 730, the process may loop back to Step 710. This looping reflects the fact that the packet drop state is monitored on an on-going basis, and handover parameter adjustments are made dynamically as the state of the node pair changes. Thus, the process may be repeatedly performed during normal operation of the network. In some examples, the process is repeated at regular intervals. In other examples, the process is repeated only when there is reason to believe that an update is needed, such as when new packet-drop information is communicated from the $N^{th}$ node or when known information changes (e.g., flag is changed from set to reset, or amount of packet drops changes from previous value to a new value).

Method 700 further includes, when the determination in Step 720 is negative, removing packet-drop-related adjustments to handover parameter(s) for $N^{th}$ Node, if there are any (Step 740). In other words, if a previously detected high-packet-drop state at the $N^{th}$ node-pair has now been resolved and packet drops have returned to an acceptable level, then any adjustments made to the handover parameters in relation to packet drops may be reverted. Other adjustments to the handover parameters that might have also been made for other reasons are not necessarily affected by this step. If no handover parameter adjustments for the $N^{th}$ node-pair are in effect, then Step 740 may be omitted. The process may then loop back to step 710 for another iteration of the process, as noted above.

In some examples, the method 700 may be performed for each of multiple node-pairs. For example, in a network with multiple dual-connectivity node-pairs, an access point (or other device) may perform the method 700 for each node-pair that is adjacent to it. Thus, in such examples the value of N may be incremented each time Step 710 is reached, with each value of N corresponding to one of the access node-pairs (or to an individual cell of a node-pair), so that a different node-pair (or a different cell) is evaluated each iteration of the method. When all of the relevant node-pairs (or cells) (e.g., all neighboring node-pairs) have been considered, N may be reset to its initial value and the method may be repeated as discussed above.

In the description above, it was assumed for ease of explanation that the packet drop amount at the shared network device is a total packet drop amount for the entire shared network device. However, in some examples, the packet drop amount at the shared network device could be a packet drop amount for a specific subset of the shared network device. For example, a specific port or group of ports could be of particular interest, such as the port(s) that connect the network device to the master access node. As another examples, the packet drop amounts may be monitored on a per-cell basis (recall that each access node may include one or more cells).

Furthermore, in the description above it was assumed for ease of explanation that when handovers are inhibited, they are inhibited for all cells of the node-pair. However, just as the packet drops could be monitored on a more granular level (e.g., per cell), in some examples handovers could also be inhibited on a more granular level. For example, if traffic for a particular cell of the node-pair is experiencing high packet drops at the shared network device, while others are not, then handovers to that specific cell could be inhibited while not inhibiting handovers to other cells. Everything described above in relation to inhibiting handovers to a node-pair is applicable to inhibiting handovers to a particular cell, and thus duplicative description thereof will be omitted.

In some embodiments, methods 500, 600, and 700 may include additional steps or operations. Methods 500, 600, and 700 are not mutually exclusive. In example systems or devices disclosed herein, processing circuitry (e.g., processing circuitry 311, processing system 405) may be configured to perform some or all of the actions or operations described herein, including but not limited to the actions/operations of the methods 500, 600, and/or 700. In some examples, the processing circuitry is configured to perform such an action/operation by virtue of machine readable instructions corresponding to the action/operation being stored in a non-transitory storage medium that is coupled to a processor of the processing circuitry such that the processor is capable of executing those instructions during operation. Machine readable instructions correspond to an action/operation described herein if they are of such a nature that they cause the processing circuitry to perform the action/operation when executed by a processor of the processing circuitry. In some examples, the processing circuitry is configured to perform an action/operation by virtue of including dedicated hardware (e.g., ASIC, FPGA, CPLD, logic circuitry) that is capable of performing the action/operation during operation. In some examples, the processing circuitry is configured to perform an action/operation by virtue of a combination of A) the processing circuitry including dedicated hardware to perform some aspects of the action/operation and B) machine readable instructions corresponding to some aspects of the action/operation being stored in a non-transitory storage medium that is accessible to a processor of the processing circuitry.

The example systems and methods described herein may be performed by, or under the control of, a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method, comprising:
monitoring an amount of packet drops at a shared cell site router of a dual connectivity access-node-pair; and
detecting whether the amount of packet drops satisfies a threshold criterion; and
in response to the amount of packet drops satisfying the threshold criterion, dynamically adjusting one or more handover parameters based on the amount of packet drops at the shared cell site router to inhibit handovers to a cell of the dual connectivity access-node-pair.

2. The method of claim 1, wherein the adjusting the one or more handover parameters to inhibit handovers to a cell of the dual connectivity access-node-pair comprises increasing or decreasing values of the one or more handover parameters by fixed amounts.

3. The method of claim 1, wherein the adjusting the one or more handover parameters to inhibit handovers to a cell of the dual connectivity access-node-pair comprises increasing or decreasing values of the one or more handover parameters by variable amounts, with the amounts by which the values of the one or more handover parameters are increased or decreased being based on the amount of packet drops.

4. The method of claim 3, further comprising determining the amounts by which the values of the one or more handover parameters are increased or decreased by evaluating a mathematical function that maps amount of packet drops to amounts of adjustment for the one or more handover parameters.

5. The method of claim 1, wherein the dynamically adjusting the one or more handover parameters based on the amount of packet drops at the shared cell site router comprises:
in response to the amount of packet drops ceasing to satisfy the threshold criterion, removing the adjustments to the one or more handover parameters.

6. The method of claim 1, wherein the monitoring the amount of packet drops and the dynamically adjusting the one or more handover parameters are performed at an adjacent access node that is separate from the access-node-pair.

7. The method of claim 6, wherein the monitoring the amount of packet drops comprises monitoring for packet drop information communicated from the dual connectivity access-node-pair.

8. The method of claim 7, wherein the packet drop information comprises a qualitative indication of whether the amount of packet drops is high at the shared cell site router of the dual connectivity access-node-pair.

9. The method of claim 7, wherein the packet drop information comprises a quantitative indication of the amount of packet drops.

10. A system, comprising:
an access node configured to deploy a radio air interface to provide wireless services to one or more wireless devices, the access node comprising processing circuitry configured to:
monitor an amount of packet drops at a shared cell site router of a dual connectivity access-node-pair; and
detecting whether the amount of packet drops satisfies a threshold criterion; and
in response to the amount of packet drops satisfying the threshold criterion, dynamically adjust one or more handover parameters based on the amount of packet drops at the shared cell site router to inhibit handovers to a cell of the dual connectivity access-node-pair.

11. The system of claim 10, wherein the processing circuitry is configured to periodically transmit information to the one or more wireless devices indicating values for handover parameters including the one or more handover parameters; and
wherein dynamically adjusting the one or more handover parameters includes transmitting an adjusted value of the one or more handover parameters.

12. The system of claim 10, further comprising:
wherein the dual connectivity access-node-pair comprises a second access node configured to use a first radio access technology (RAT) and a third access node configured to use a second RAT,
wherein the access node is separate from the dual connectivity access-node-pair, and the access node is configured to monitor the amount of packet drops by monitoring for packet drop information communicated from the dual connectivity access-node-pair.

13. The system of claim 12, wherein the shared cell site router is at a cell site shared by the second and third access nodes.

14. The system of claim 12, wherein the packet drop information comprises a qualitative indication of whether the amount of packet drops is high at the shared cell site router of the dual connectivity access-node-pair or a quantitative indication of the amount of packet drops.

15. The system of claim 12, wherein the second access node is a long-term-evolution (LTE) eNodeB and the third access node is a 5G New Radio (5G NR) gNodeB.

16. The system of claim 10, wherein the access node is part of the dual connectivity access-node-pair.

17. The system of claim 10,
wherein the processing circuitry is configured to
adjust the one or more handover parameters to inhibit handovers to a cell of the dual connectivity access-node-pair by increasing or decreasing values of the one or more handover parameters by variable amounts,
determine the amounts by which the values of the one or more handover parameters are increased or decreased based on the amount of packet drops.

18. A processing node configured to perform operations comprising:
a processor for monitoring an amount of packet drops at a shared cell site router of a dual connectivity access-node-pair; and
detecting whether the amount of packet drops satisfies a threshold criterion; and
in response to the amount of packet drops satisfying the threshold criterion, dynamically adjusting one or more handover parameters based on the amount of packet drops at the shared cell site router to inhibit handovers to a cell of the dual connectivity access-node-pair.

* * * * *